United States Patent [19]

Bourgeois

[11] 4,177,753
[45] Dec. 11, 1979

[54] WETTING STATION, ROTATING CONVEYOR STATION, SELF CLEANING CONVEYOR UNIT, AND CONVEYOR SYSTEM USING SAME

[76] Inventor: Ronald D. Bourgeois, 38 Ellison Pk., Waltham, Mass. 02154

[21] Appl. No.: 818,318

[22] Filed: Jul. 25, 1977

[51] Int. Cl.² .................. A23G 3/20; B05C 3/10; B05C 19/00
[52] U.S. Cl. .................. 118/16; 118/17; 118/19; 118/30
[58] Field of Search .......... 118/16, 19, 17, 22, 118/30, 418, 324, 423

[56] References Cited

U.S. PATENT DOCUMENTS

| | | | |
|---|---|---|---|
| 1,908,539 | 5/1933 | Quick | 118/19 |
| 3,102,052 | 8/1963 | Ackles | 118/19 |
| 3,141,792 | 7/1964 | Lachman et al. | 118/19 X |
| 3,608,516 | 9/1971 | Temple | 118/19 X |
| 3,647,189 | 3/1972 | Johnson | 118/16 X |
| 3,915,116 | 10/1975 | Booth | 118/16 |

FOREIGN PATENT DOCUMENTS 270561 5/1927 United Kingdom ............ 118/30

*Primary Examiner*—John P. McIntosh
*Attorney, Agent, or Firm*—Joseph S. Iandiorio

[57] ABSTRACT

A conveyor system including a wetting station having a container adapted for holding a wetting agent; a slack conveyor belt having at least its transfer path portion extending through the container and at least a part of that portion dipping below the level of the wetting agent; and a ballast roller, at least partially submerged in the wetting agent and bearing on the part of the transfer path portion of the conveyor belt which dips into the wetting agent, for compelling conveyed objects to pass submerged in the wetting agent between the ballast roller and the conveyor belt; and a rotating conveyor station including a hollow drum open at one end; means for rotating the drum about a generally horizontal longitudinal axis; and a plurality of pick-up elements extending generally radially inwardly from the inner surface of the drum for picking up items accumulated in the lower position in the drum and carrying them to the upper position in the drum for release onto an intermediate conveyor; and a self cleaning conveyor unit including a support structure having a bottom member and two side members; a plurality of roller means supported by the support structure and a perforate conveyor belt driven on the roller means and extending in its return path along the bottom member for a substantial portion of the length of the bottom member for sweeping particles dropped from the transported objects and accumulating on the bottom member in the direction from the terminus toward the origin of the conveyor belt.

1 Claim, 6 Drawing Figures

WETTING STATION, ROTATING CONVEYOR STATION, SELF CLEANING CONVEYOR UNIT, AND CONVEYOR SYSTEM USING SAME

FIELD OF INVENTION

This invention relates to a wetting station, a rotating conveyor station, a self cleaning conveyor unit and a conveyor system including two or all of them.

BACKGROUND OF INVENTION

In a number of industries it is necessary to wet parts, with liquid or flowable material, to coat the parts with a particulate material, to lift the parts from a lower to a higher level, to remove excess material from the parts, and to perform any two or more of these operations. For example, in the food industry onion rings are processed by subjecting them to a batter bath, rolling them in a batter powder and then packaging them. Presently the wetting operation is done with sprinkler nozzles that spray the parts as they are conveyed beneath it. This requires that the batter liquid be accumulated in a container having an agitator and then pumped through lines to the nozzles. Often the sprinkling action does not completely coat the parts. The parts are tumbled in the batter powder and then must be transported to the next conveyor device. The excess powder falling from the parts is often lost to the process and may contaminate and clog the subsequent conveyors and machines.

SUMMARY OF INVENTION

It is therefore an object of this invention to provide an improved, simple, and extremely effective wetting station.

It is a further object of this invention to provide such a wetting station which easily, automatically adjusts to and gently treats various sizes of objects to be wetted.

It is a further object of this invention to provide an improved, simple and efficient rotating conveyor station for capturing, lifting, and releasing parts to be conveyed.

It is a further object of this invention to provide such a rotating conveyor station which functions to tumble parts in a particulate substance.

It is a further object of this invention to provide an improved, simple and effective self cleaning conveyor unit.

It is a further object of this invention to provide such a unit which causes parts to shed any excess particulate material.

It is a further object of this invention to provide an improved, simple, efficient, wholly automatic conveyor system utilizing the wetting and rotating conveyor stations and self cleaning conveyor unit.

This invention features a wetting station for a conveyor system including a container adapted to hold a wetting agent. A slack conveyor belt is provided having at least its transfer path portion extending through the container with at least a part of that portion dipping below the level of the wetting agent. A ballast roller at least partially submerged in the wetting agent bears on the part of the transfer path portion of the conveyor belt which dips into the wetting agent and compels conveyed objects to pass submerged in the wetting agent between the ballast roller and the conveyor belt.

The invention also features a rotating conveyor station which includes a hollow drum open at one end. There are means for rotating the drum about a generally horizontal longitudinal axis. A plurality of pick-up elements extend generally radially inwardly from the inner surface of the drum for picking up items accumulated in the lower position of the drum and carrying them to the upper position of the drum for release onto an intermediate conveyor or other device.

In a preferred embodiment, the drum contains a coating agent. The hollow drum is open at one end and closed at the other, and the open end of the drum is higher than the closed end in order to retain the coating agent.

The invention also features a self cleaning conveyor unit which includes a support structure having a bottom member and two side members. There are a plurality of roller means supported by the support structure. A perforate conveyor belt driven on the roller means extends in its return path along the bottom member for a substantial portion of the length of the bottom member so that it sweeps particles dropped from the transported objects and accumulated on the bottom member back in the direction from the terminus toward the origin of the conveyor belt.

The invention also features a total conveyor system which includes two or more of the wetting station, rotating conveyor station, and self cleaning conveyor unit.

DISCLOSURE OF PREFERRED EMBODIMENT

Other objects, features and advantages will occur from the following description of a preferred embodiment and the accompanying drawings, in which.

The invention may be accomplished with a conveyor system using a wetting station, rotating conveyor station, and a self cleaning conveyor unit, and each of them. The wetting station typically includes a container adapted for holding the wetting agent, and a slack conveyor belt which has at least its transfer path portion extending through the container and at least a part of that portion dipping below the wetting agent. There is a ballast roller which is at least partially submerged in the wetting agent and which bears on the part of the transfer portion of the conveyor belt which dips into the wetting agent so as to compel the conveyed objects to pass submerged in the wetting agent between the ballast roller and conveyor belt. The conveyor belt typically has at least a portion of its conveyor path extending within the container and submerged in the wetting agent along the bottom of the container so that it stirs the wetting agent as it moves. The ballast roller may be vertically moveable relative to the transfer path portion of the conveyor belt for accommodating variations in the thickness of the conveyed objects which must pass between it and the belt.

The rotating conveyor station includes a hollow drum open at one end and means for rotating the drum about a generally horizontally longitudinal axis. A plurality of pick-up elements extend generally, radially inwardly from the inner surface of the drum for picking up items accumulated in the lower position in the drum and carrying them to the upper position in the drum for release onto an intermediate conveyor or other device. The drum is typically hollow at one end and closed at the other, and the open end of the drum is higher than the closed end for retaining the coating agent in it.

The self cleaning conveyor unit includes a support unit structure including a bottom member and two side members. A plurality of roller means are supported by the support structure. A perforate conveyor belt driven on the roller means and extending on its return path along the bottom member for a substantial portion of length of the bottom member, sweeps particles dropped or shaken from the transported objects and accumulating on the bottom member back in the direction from the terminus toward the origin of the conveyor belt. Typically the side members extend substantially beyond the bottom member toward the origin of the conveyor belt so that the particles swept toward the origin drop to some collector means beneath. Generally the support structure is tilted with the terminus set higher than the origin of the conveyor belt to aid the action of the belt sweeping the particles from the terminus to the origin. A shaker member may be provided extending from the support structure for jarring the belt so as to shake loose particles from the belt and from the conveyed objects.

Figure 1:
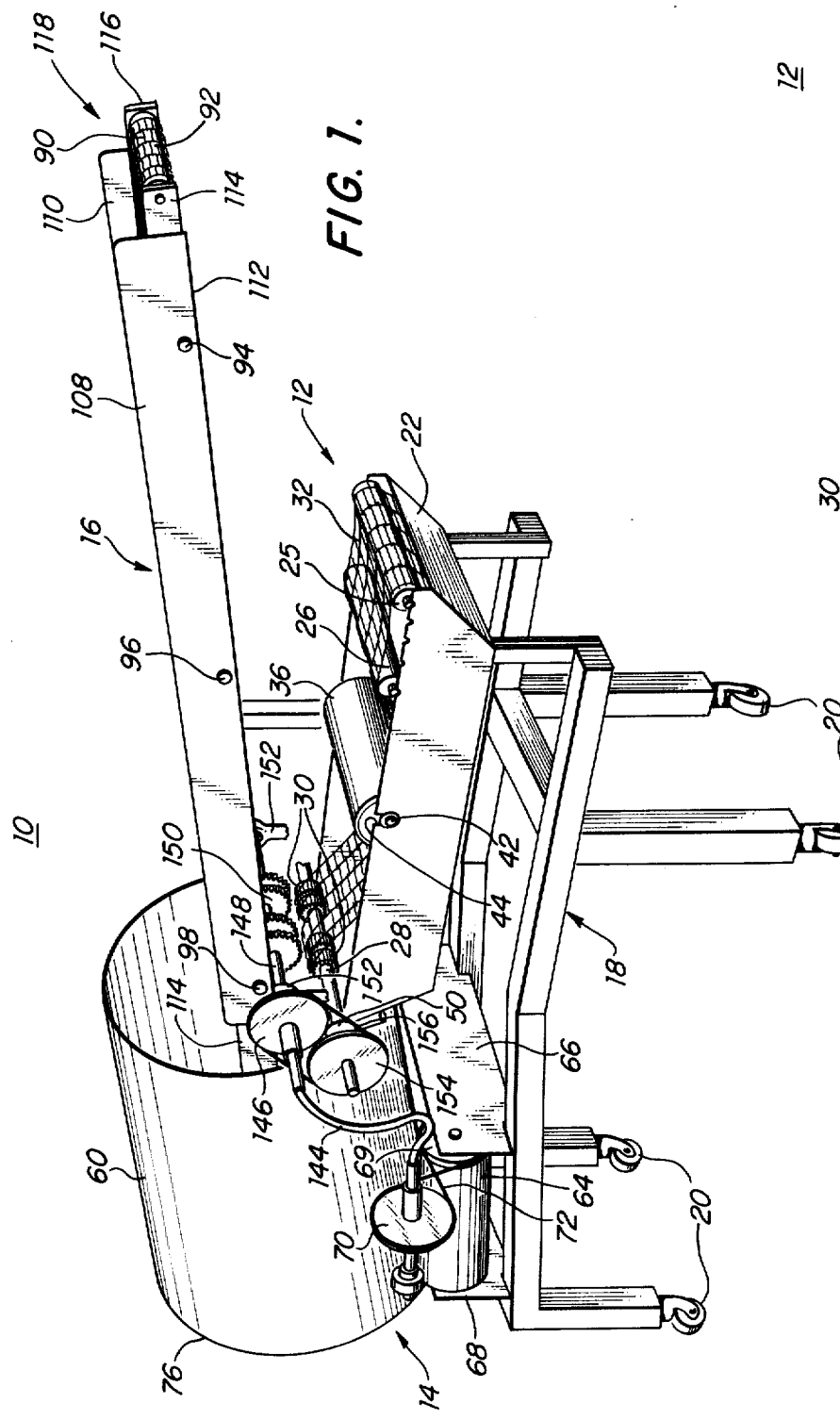
FIG. 1 is a simplified, diagrammatic, axonometric illustration of a conveyor system including a wetting station, a rotating conveyor station, and a self cleaning conveyor unit according to this invention.

There is shown in FIG. 1 a conveyor system 10 according to this invention including a wetting station 12, a rotating conveyor station 14, and a self cleaning conveyor unit 16, which may be supported on a moveable frame 18 having wheels 20; parts of frame 18 have been omitted for clarity.

Figure 2:
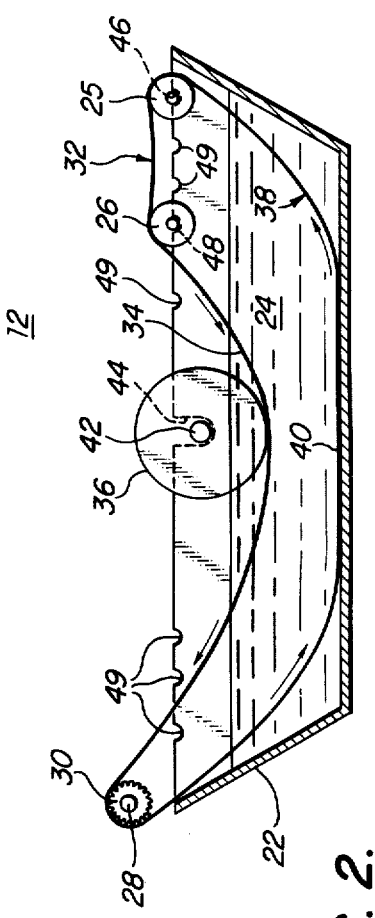
FIG. 2 is a simplified, cross-sectional illustration of a portion of a wetting station according to this invention.

Wetting station 12, FIGS. 1 and 2, includes a container 22 for holding wetting agent 24 and carries a number of idler rollers 25, 26, as well as drive shaft 28 with one or more gears 30 for driving perforate conveyor belt 32. At least a portion 34, FIG. 2, of belt 32 passes through the wetting agent 24 and ballast roller 36 bears on that area 34 of belt 32. Belt 32 may also pass inside container 22 in the wetting agent 24 in its return path 38, where it is desirable either to minimize dripping and contamination of the environment with the wetting agent 24 or where the movement of belt 32 in its return path 38 along the bottom of container 32 for at least a portion 40 of the return path is desirable to stir up the wetting agent. Belt 32 is slack in order to allow it to droop along the bottom of container 22 and to allow it to easily adapt itself to varying distances between portion 34 and ballast roller 36 to accommodate various thicknesses of goods conveyed without damaging them. In addition, ballast roller 36 may have its end studs 42, only one of which is shown, mounted in vertical slots 44, only one of which is shown, in order to further accommodate the size variations in the objects conveyed between it and portion 34 of conveyor belt 32. Idler rollers 25 and 26 may be mounted in notches 46, 48, in the sides of container 22. The drive shaft 28 is typically mounted in bearings 50, only one of which is shown, FIG. 1, which in turn is mounted to part of frame 18.

With belt 32 moving in the direction shown in FIG. 2, the position of rollers 25 and 26 are used to limit the size of the area 34 which dips beneath the surface of wetting agent 24, which controls the time that the objects are submerged and thus the amount of agent that they absorb. The speed of the conveyor also controls the exposure time. Alternatively, when belt 32 is moving in the direction opposite to that shown, rollers 25 and 26 operate to define a length of time or travel during which objects may dip excess wetting agent 24 lower into tank 22. A number of notches 49 are provided for the positioning of rollers 25, 26 and similar rollers.

Figure 3:
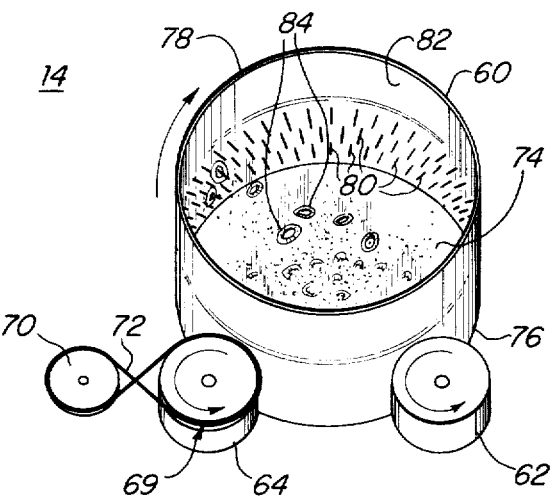
FIG. 3 is a simplified, diagrammatic illustration of a portion of the rotating conveyor station according to this invention, viewing from the open end of the drum.

Rotating conveyor station 14, FIG. 3, includes drum 16 carried by cylinders 62 and 64 which are rotatably supported in mounts 66 and 68 carried on frame 18. Cylinder 64 includes a self-contained motor such as a powerroll, No. 1-312-060, manufactured by Interroll Corporation, Hauppage, New York, which rotates in the direction as indicated by the arrow, and drives drum 60 and pulley 70 through belt 72 and pulley 69 mounted on cylinder 64. Drum 60 is closed by its bottom plate 74 at its lower end 76 and is open at its upper end 78. There are a multiplicity of pins 80 which extend radially inwardly from inner surface 82 of drum 60. A particulate or other type of coating agent may be carried in the lower end 76 of drum 60 for coating articles which are delivered to it from wetting station 12. As drum 60 rotates, pins 80 engage these conveyed articles 84 and carry them around to the upper position of the drum, where the articles are released by gravity and fall onto some intermediate device such as, for example, conveyor unit 16. In this way rotating conveyor station 14 serves both to convey the articles from the lower station 12 to the upper conveyor unit 16, while at the same time providing an efficient method of coating articles 84 in a protected environment where the coating agent will not escape.

Figure 4:
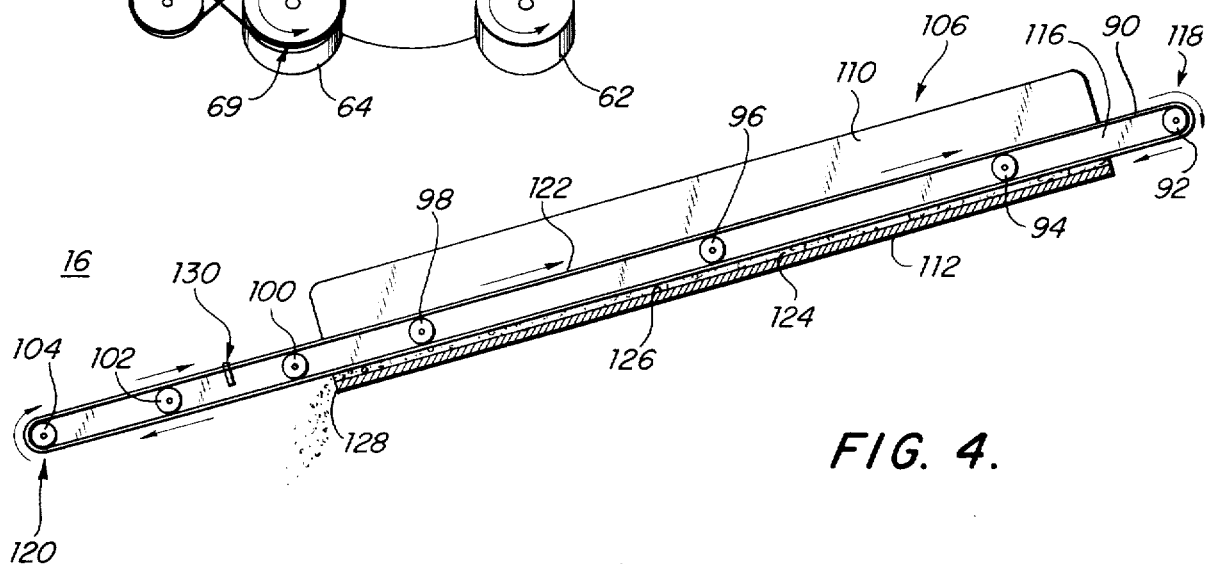
FIG. 4 is a simplified, diagrammatic, side, cross-sectional, elevational illustration of a self cleaning conveyor unit according to this invention.

Conveyor unit 16 includes a perforate or open structure conveyor belt 90, FIGS. 1 and 4, carried on idler rollers 92, 94, 96, 98, 100, 102, and 104, which are mounted in support structure 106 formed of bottom member 112 and including side members 108 and 110 and side elements 114 and 116, which extend slightly beyond the side members 108 and 110 at the terminal end 118 of conveyor unit 16 and, to a greater extent, at the origin end 120 of conveyor unit 16. As the goods move from the origin 120 toward the terminal end 118 of conveyor unit 16 over the transfer path 122 of belt 90, particles are loosened and dropped to accumulate on the top surface 126 of member 112. However, in its return path 124, belt 90 moves along the upper surface 126 of member 112 and draws these particles back down toward the origin end. When the particles reach the origin end 128 of bottom member 112, the particles fall off and are caught by a suitable collector. In system 10 of this invention, this portion of the conveyor unit 16 is housed wholly within drum 60 so that the particles fall right back down into the area of drum 116, where they can be reused to coat subsequent articles as they are present from wetting station 12 to rotating conveyor and coating station 14. As shown in the figures, the conveyor unit 16 may be tilted to aid in the sweeping action of conveyor belt 90 in its return path.

Figure 5:
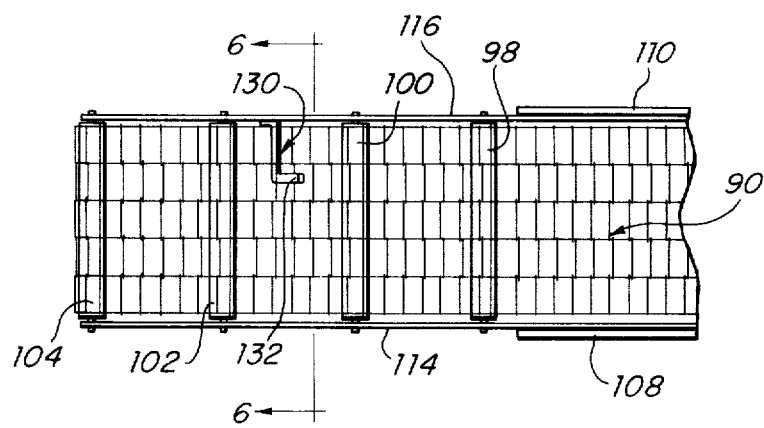
FIG. 5 is a top plan view of a portion of the conveyor unit of FIG. 4.
Figure 6:
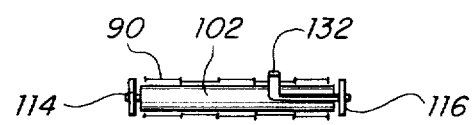
FIG. 6 is a view showing the shaker element according to this invention, taken along line 6—6 of FIG. 5.

To insure that the loose powdery or particulate material is dropped from the conveyed articles or parts and that such particulate material does not adhere to belt 90, one or more shaker devices 130, FIGS. 5 and 6, may be attached to the inside of rail 116, for example, so that a stiff but relatively flexible salient portion 132 rises to attempt to protrude through the perforations or open areas of belt 90 and continually come in contact with successive solid portions of the belt in order to continually jar the belt and shake loose any particulate material that falls either into drum 60 or onto member 112, whereupon it is swept back into drum 60 by belt 90 as it moves over its return path 124.

One or more shaker devices 130 may be positioned at various places along belt 90: between rollers 92 and 94; 94 and 96; 96 and 98; 98 and 100; 100 and 102; and 102 and 104.

Both wetting station 12 and conveyor unit 16 are driven from the self-contained motor in cylinder 64, whose pulley through belt 72 drives pulley 70. Pulley 70, in turn, is connected to a flexible shaft 144, which in turn is connected to pulley 146 that drives shaft 148 having gears 150 which drive belt 90 through contact with its return portion 124. Shaft 148 is supported in bearings 152, which are mounted on frame 18. Pulley 146 drives pulley 154 through belt 156, and pulley 154 drives drive shaft 28 of wetting station 12.

In operation, parts to be wetted, such as for example onion rings, are deposited on conveyor 32 where they are carried on conveyor belt 32 beneath ballast roller 44 through wetting agent 24 in container 22. They are then conveyed out of wetting agent 24 into drum 60, where they are tumbled in the powder or other particulate material, engaged by pins 80 at the lower position of the drum, which then lift them to the upper position of the drum and release them to fall on the origin end 120 of conveyor unit 16. As they are conveyed along conveyor 90 material adhered to them will drop either directly through the belt back into the drum, or down onto bottom member 112, and will then be swept back down into the drum by conveyor 90 as it moves through its return path 124 along the upper surface 126 of bottom member 112.

Other embodiments will occur to those skilled in the art and are within the following claims:

What is claimed is:

1. A conveyor system comprising:

a wetting station including a container adapted for holding a wetting agent;

a slack conveyor belt having at least its transfer path portion extending through said container and at least a part of that portion dipping below the level of the wetting agent;

a ballast roller, at least partially submerged in the wetting agent and bearing on the part of the transfer path portion of the conveyor belt which dips into the wetting agent, for compelling conveyed objects to pass submerged in the wetting agent between the ballast roller and conveyor belt, said ballast roller being continuously vertically moveable relative to the transfer path portion of said conveyor belt for accommodating variations in the thickness of conveyed objects;

a rotating conveyor station including a hollow drum open at only one end for receiving objects conveyed from said wetting station;

means for rotating said drum about an inclined, longitudinal axis with its open end being the higher end;

a plurality of individual pick-up pins extending generally, radially inwardly from the inner surface of said drum for picking up items accumulated with the coating agent in the lower position in said drum and carrying them to the upper position in the drum for release onto a self-cleaning conveyor unit including a support structure including a bottom member and two side members;

a plurality of roller means supported by said support structure; and a perforate conveyor belt driven on said roller means and extending in its return path along said bottom member for a substantial portion of the length of said bottom member for sweeping particles dropped from the transported objects and accumulating on said bottom member back in the direction from the terminus toward the origin of the conveyor belt for return to said drum; said side members extending substantially beyond said bottom member toward the origin of said conveyor belt; said support structure being tilted with the terminus set higher than the origin of the conveyor belt; and a shaker member extending from said side members beyond said bottom member for jarring said belt to shake loose particles from said belt and conveyed objects.

* * * * *